US011525605B2

(12) United States Patent
Pfaffl et al.

(10) Patent No.: US 11,525,605 B2
(45) Date of Patent: Dec. 13, 2022

(54) COOLING CIRCUIT HAVING A GAS DISCHARGE UNIT REMOVING GASEOUS REFRIGERANT FROM A COMPRESSOR FEED LINE

(71) Applicant: BITZER Kuehlmaschinenbau GmbH, Sindelfingen (DE)

(72) Inventors: Julian Pfaffl, Tuebingen (DE); Klaus Ohser, Wiedemar OT Kyhna (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 583 days.

(21) Appl. No.: 15/157,870

(22) Filed: May 18, 2016

(65) Prior Publication Data

US 2016/0258655 A1    Sep. 8, 2016

Related U.S. Application Data

(63) Continuation of application No. PCT/EP2014/073575, filed on Nov. 3, 2014.

(30) Foreign Application Priority Data

Nov. 18, 2013  (DE) .......................... 102013112670.7

(51) Int. Cl.
*F25B 31/00*  (2006.01)
*F04B 39/06*  (2006.01)
(Continued)

(52) U.S. Cl.
CPC .............. *F25B 1/02* (2013.01); *F04B 17/046* (2013.01); *F25B 1/005* (2013.01); *F25B 1/04* (2013.01);
(Continued)

(58) Field of Classification Search
CPC ........ F25B 41/062; F25B 49/022; F25B 1/10; F25B 13/00; F25B 31/008;
(Continued)

(56) References Cited

U.S. PATENT DOCUMENTS 2,577,107 A * 12/1951 Cooper ................. F25B 31/008
                                                        62/197
3,848,422 A * 11/1974 Schibbye ................ F25B 1/047
                                                        62/84
(Continued)

FOREIGN PATENT DOCUMENTS

DE        2101950      7/1971
DE        9413446 U1   10/1994
(Continued)

*Primary Examiner* — Henry T Crenshaw
*Assistant Examiner* — Daniel C Comings
(74) *Attorney, Agent, or Firm* — Reinhart Boerner Van Deuren P.C.

(57) ABSTRACT

A cooling circuit comprises a refrigerant compressor incorporating a suction port and a pressure chamber incorporating a pressure port, a condenser arranged downstream of the pressure port, a fluid collecting chamber in which a reservoir of refrigerant is formed, an evaporator which is located between the condenser and the suction port, a feed unit which is connected at one side to the refrigerant reservoir and to the pressure chamber at the other side and which serves for supplying refrigerant from the refrigerant reservoir to the pressure chamber which incorporates a pumping unit for the refrigerant. It is proposed that in order improve this cooling circuit, the pumping unit comprise a pressure-tight closed housing which is provided with only one inlet and one outlet as access points and a pumping element which is movable for pumping the refrigerant be arranged in the pumping chamber thereof.

24 Claims, 5 Drawing Sheets

(51) Int. Cl.
*F25B 1/02* (2006.01)
*F25B 1/00* (2006.01)
*F04B 17/04* (2006.01)
*F25B 1/04* (2006.01)

(52) U.S. Cl.
CPC .......... *F25B 31/008* (2013.01); *F04B 39/062* (2013.01); *F25B 2600/13* (2013.01); *Y02B 30/70* (2013.01)

(58) Field of Classification Search
CPC ........ F25B 2339/044; F25B 2339/0444; F25B 2339/0445; F25B 2339/0446; F25B 2400/0409; F25B 1/02; F25B 1/04; F25B 31/006; F25B 43/00; F25B 2500/26; F04B 17/046; F04B 39/062; F04B 2203/0203; F04B 2203/0403
USPC .......................................... 62/115, 498, 324.1
See application file for complete search history.

(56) References Cited

U.S. PATENT DOCUMENTS

| | | | | |
|---|---|---|---|---|
| 5,228,301 A | * | 7/1993 | Sjoholm | B60H 1/00007 165/263 |
| 5,694,780 A | | 12/1997 | Alsenz | |
| 6,058,727 A | * | 5/2000 | Fraser, Jr. | F25B 31/002 62/190 |
| 7,780,425 B2 | * | 8/2010 | Kreuter | F04B 27/02 417/534 |
| 9,004,883 B2 | * | 4/2015 | Neelakantan | F04B 11/0058 417/417 |
| 9,739,519 B2 | * | 8/2017 | Gan | F25D 17/06 |
| 2005/0262858 A1 | * | 12/2005 | Inaba | B60H 1/00878 62/190 |
| 2006/0242985 A1 | * | 11/2006 | Leck | B60H 1/3223 62/323.1 |
| 2006/0254309 A1 | * | 11/2006 | Takeuchi | F01C 11/004 62/501 |
| 2009/0191073 A1 | * | 7/2009 | Kopecek | F04B 17/044 417/415 |
| 2011/0203304 A1 | | 8/2011 | Sato et al. | |
| 2015/0159919 A1 | * | 6/2015 | Sato | F25B 30/02 62/498 |
| 2015/0300713 A1 | * | 10/2015 | Sun | F25B 49/022 62/115 |

FOREIGN PATENT DOCUMENTS

| | | |
|---|---|---|
| DE | 4338939 C1 | 2/1995 |
| EP | 0506189 A1 | 9/1992 |
| EP | 1719960 A1 | 11/2006 |

* cited by examiner

COOLING CIRCUIT HAVING A GAS DISCHARGE UNIT REMOVING GASEOUS REFRIGERANT FROM A COMPRESSOR FEED LINE

CROSS-REFERENCE TO RELATED PATENT APPLICATION

This application is a continuation of international application number PCT/EP2014/073575 filed on Nov. 3, 2014.

This patent application claims the benefit of International application No. PCT/EP2014/073575 of Nov. 3, 2014 and German application No. 10 2013 112 670.7 of Nov. 18, 2013, the teachings and disclosure of which are hereby incorporated in their entirety by reference thereto.

BACKGROUND OF THE INVENTION

The invention relates to a cooling circuit comprising a refrigerant compressor incorporating a suction port and a pressure chamber incorporating a pressure port, a condenser which is arranged in the cooling circuit downstream of the pressure port and comprises a fluid collecting chamber in which a reservoir of refrigerant is formed, an evaporator which is located in the cooling circuit between the condenser and the suction port, a feed unit which is connected at one side to the refrigerant reservoir and to the pressure chamber at the other side and which serves for supplying refrigerant from the refrigerant reservoir to the pressure chamber and which incorporates a pumping unit for the refrigerant.

Cooling circuits of this type are known from the state of the art such as DE 43 38 939 C1 for example.

In these known cooling circuits however, complex pumping units were provided for the feed unit and this has led to economically non-realizable solutions.

Consequently, the object of the invention is to improve a cooling circuit of the type indicated in the preamble of the main Claim in such a way that it is realizable in an economically more meaningful manner.

In accordance with the invention, this object is achieved in the case of a cooling circuit of the type described hereinabove in that the pumping unit comprises a pressure-tight closed housing which is provided with only one inlet and one outlet as access points, and a pumping element which is movable for pumping the refrigerant is arranged in the pumping chamber thereof.

SUMMARY OF THE INVENTION

The advantage of the solution in accordance with the invention is to be seen in that it is then possible to utilise simply built pumps having a very low handling capacity which will suffice for the application in accordance with the invention, such pumps having a very low leakage rate for the pressurised refrigerant in keeping with their permanently closed construction and being producible economically and operable economically.

A low leakage rate in keeping with the permanently closed devices of this type amounts to 3 g/year or less per connection port under a pressure of at least 0.25 times the maximally permissible pressure.

In consequence, a cooling circuit of the type described in the preamble of the main Claim can be operated efficiently when using the solution in accordance with the invention.

In the context of the present invention, liquefaction of the refrigerant is effected in a condenser in the event of a subcritical mode of operation as is the case in the usual commercially used refrigerants, but in the event of a supercritical mode of operation however, only cooling of the refrigerant without liquefaction thereof occurs.

Consequently, liquid refrigerant collects in the fluid collecting chamber in a subcritical mode of operation, but a cooled gaseous refrigerant collects in the event of a supercritical mode of operation.

It is particularly advantageous hereby for the pumping chamber to be arranged in a pressure-tight closed pumping chamber housing.

In the case of a solution of this type, the pumping chamber is thus arranged directly in a pressure-tight housing.

Furthermore, it is advantageously envisaged in this solution that the pumping element be driven by an electromagnetic or magnetic force that is effective through the pumping chamber housing.

A solution of this type is particularly advantageous since the pumping chamber housing can then be of very small volume and consequently this very small volume can be closed in pressure-tight manner in a simple manner and with simple means so that the constructional realization of the solution in accordance with the invention is thereby particularly simple in regard to the cost thereof.

A pressure-tight termination in the sense of the solution in accordance with the invention is to be understood in particular as a termination which is free of a mechanical feed-through for a drive of the pumping element, i.e. all the complex sealing measures that are necessary in the region of a mechanical feed-through for a drive but which nevertheless lead to leakages at the requisite pressures of more than 15 bar for example, preferably of more than 20 bar and still better of more than 25 bar can be avoided.

The most varied of possibilities are conceivable in regard to the construction of the pumping element.

Hereby, one particularly simple and economically realizable solution envisages that the pumping element be in the form of a piston.

A piston of this type could, for example, be a conventional piston of a piston pump. However, a particularly simple and expedient solution envisages that the piston be constructed in the form of a spring-loaded oscillating piston so that it can then move in oscillatory manner due to the spring loading thereof.

In particular, a oscillating piston of this type can easily be driven in oscillatory manner by means of a solenoid coil.

To this end, an alternative solution envisages that the pumping element be in the form of a pumping element which rotates about an axis and is thus, in particular, also driven in rotary manner.

A rotary pumping element of this type permits of a multiplicity of simply realizable forms of pump having a rotary pumping element.

For example hereby, provision is made for the rotary pumping element to be a gear wheel in a set of gear wheels in a gear pump.

A particularly expedient solution envisages that the pumping unit be controlled by a refrigerant supply control unit.

With the aid of the refrigerant supply control unit, there is then the possibility of not only controlling the processes of switching on and switching off the pumping unit but, by controlling the delivery rate of the pumping unit, it is also possible to control the cooling of the pressure chamber and thus of regulating the temperature of the pressure chamber in order to hold the temperature within a range about a given threshold value.

As an alternative or in addition to the initially described solution in accordance with the invention, a further solution of the object specified hereinabove envisages that a gas discharge unit be associated with the pumping unit, wherein said unit comprises a gas discharge line which conducts away gaseous refrigerant from the feed unit.

The advantage of this solution is to be seen in that it is then possible to remove a gas cushion of refrigerant which is formed during the switching off periods in the region of the pumping unit and in particular at the inlet side of the pumping unit and which, in the case of pumping units having a low flow rate, leads to them only beginning to pump liquid refrigerant after at least a long start-up time or only occasionally pumping liquid refrigerant or not pumping any liquid refrigerant at all during the envisaged run time since, once a build-up of a gas of the refrigerant at the inlet side of the pumping unit has occurred, the low delivery rate of the pumping unit is insufficient to pump away quickly enough the gas that has been formed by the input of heat so that eventually, the pumping unit is unable to reliably pump liquid refrigerant, this being something that is essential for the solution in accordance with the invention because the envisaged low delivery rates of the pumping unit in accordance with the invention then only lead to a meaningful cooling process in the pressure chamber if they are delivering liquid refrigerant which can then evaporate in the pressure chamber and thereby absorb heat.

For example hereby, the gas discharge line could lead to a refrigerant path at an intermediate pressure level, to an intermediate pressure port of the compressor for example.

A particularly expedient solution envisages that the gas discharge line lead into a refrigerant path of the cooling circuit which is at suction-side pressure so that there is a large pressure difference available for discharging the gaseous refrigerant from the feed unit and it can thus be rapidly removed.

Herein, the refrigerant path of the cooling circuit which is at suction-side pressure is to be understood as the entire refrigerant path running from the evaporator to the suction chamber of the compressor.

It is particularly expedient if the gas discharge line leads into the refrigerant path which is at suction-side pressure prior to the suction port of the compressor so that, in the event of liquid refrigerant being supplied by way of the gas discharge line to this refrigerant path, there is an opportunity for it to evaporate before reaching the suction chamber.

In particular, it is expedient if the refrigerant path which is at suction-side pressure runs from the suction port of the compressor in the compressor housing through a motor compartment of the compressor in order to cool it so that evaporation of any liquid refrigerant that is being supplied can be assisted by joining the gas discharge line prior to the motor compartment or into the motor compartment.

Furthermore, one expedient solution envisages that the gas discharge unit be connected to a supply line section of the feed unit leading to the inlet of the pumping unit.

However, the supply of refrigerant over the gas discharge line to the refrigerant path which is at suction-side pressure can also be used to good effect for cooling the compressor.

To this end, a throttle or an expansion unit is preferably provided in the gas discharge line, for example, prior to the junction thereof into the refrigerant path which is at suction-side pressure, said throttle or expansion unit expanding and thus cooling the refrigerant before it enters the refrigerant path which is at suction-side pressure so that this cooled refrigerant can be supplied to the compressor at the suction-side.

Another advantageous solution envisages that the gas discharge unit be connected to a discharge line section of the feed unit leading to the pressure chamber.

A particularly expedient solution envisages that the gas discharge unit be connected to an inlet of the pumping unit and/or to an outlet of the pumping unit in order to enable the pumping unit to be supplied with liquid refrigerant insofar as possible before it starts or immediately after it has started so that it will pump liquid refrigerant to the pressure chamber.

In order to be able to activate and deactivate the gas discharge unit, provision is preferably made for an on-off valve to be associated with the gas discharge unit and in particular, for it to be provided in the gas discharge line.

Preferably hereby, the on-off valve is controllable by a refrigerant supply control unit in such a way that the gas discharge unit is activated thereby either before or when switching-on the pumping unit and firstly, during a definable time period for example, gaseous refrigerant and possibly some of the liquid refrigerant flowing after it is conducted away until such time as only liquid refrigerant is present at the pumping unit for the purposes of pumping it to the pressure chamber.

Hereby for example, a length of time is selected in such a way that at the end of this period it is ensured that liquid refrigerant is present at the inlet of the pumping unit in every operational state of the cooling circuit.

A further advantageous solution, which reduces the supply of liquid refrigerant to the suction-pressure-side of the refrigerant path, envisages that the length of time be adjustable so as to be variable in correspondence with the actual operational state of the cooling circuit wherein the operational state of the cooling circuit is detected by sensors such as temperature and/or pressure sensors for example.

However, as an alternative thereto, there is also the possibility of detecting whether liquid refrigerant is already present in the supply line section and/or in the discharge line section and/or in the gas discharge unit by means of a liquid sensor for example, and then, if this is the case, to deactivate the gas discharge unit.

As an alternative or in addition to the previously described mode of operation, the conveyance of liquid refrigerant in the gas discharge line can also be detected by the provision of a throttle in the gas discharge line so that when refrigerant flows therethrough the temperature of the refrigerant is reduced due to the expansion process and this reduction of temperature is detectable by a sensor located downstream of the throttle and/or a sensor located upstream of the throttle so that, upon the occurrence of a reduction of temperature corresponding to the expansion of liquid refrigerant, the gas discharge unit is deactivated.

Furthermore, the invention relates to a method of operating a cooling circuit comprising a refrigerant compressor incorporating a suction port and a pressure chamber incorporating a pressure port, a condenser which is arranged in the cooling circuit downstream of the pressure port and comprises a fluid collecting chamber in which a refrigerant reservoir of refrigerant is formed, an evaporator located in the cooling circuit between the condenser and the suction port, a feed unit which is connected at one side to the refrigerant reservoir and to the pressure chamber at the other side and serves for supplying refrigerant from the refrigerant reservoir to the pressure chamber which incorporates a pumping unit for the refrigerant and with the aid of which refrigerant is supplied by means of the feed unit to the pressure chamber for the purposes of cooling it, wherein gaseous refrigerant is conducted away from the feed unit by means of a gas discharge unit.

Further features of the invention form the subject matter of the following description and the graphical illustration of some exemplary embodiments.

DETAILED DESCRIPTION OF THE INVENTION

Figure 1:
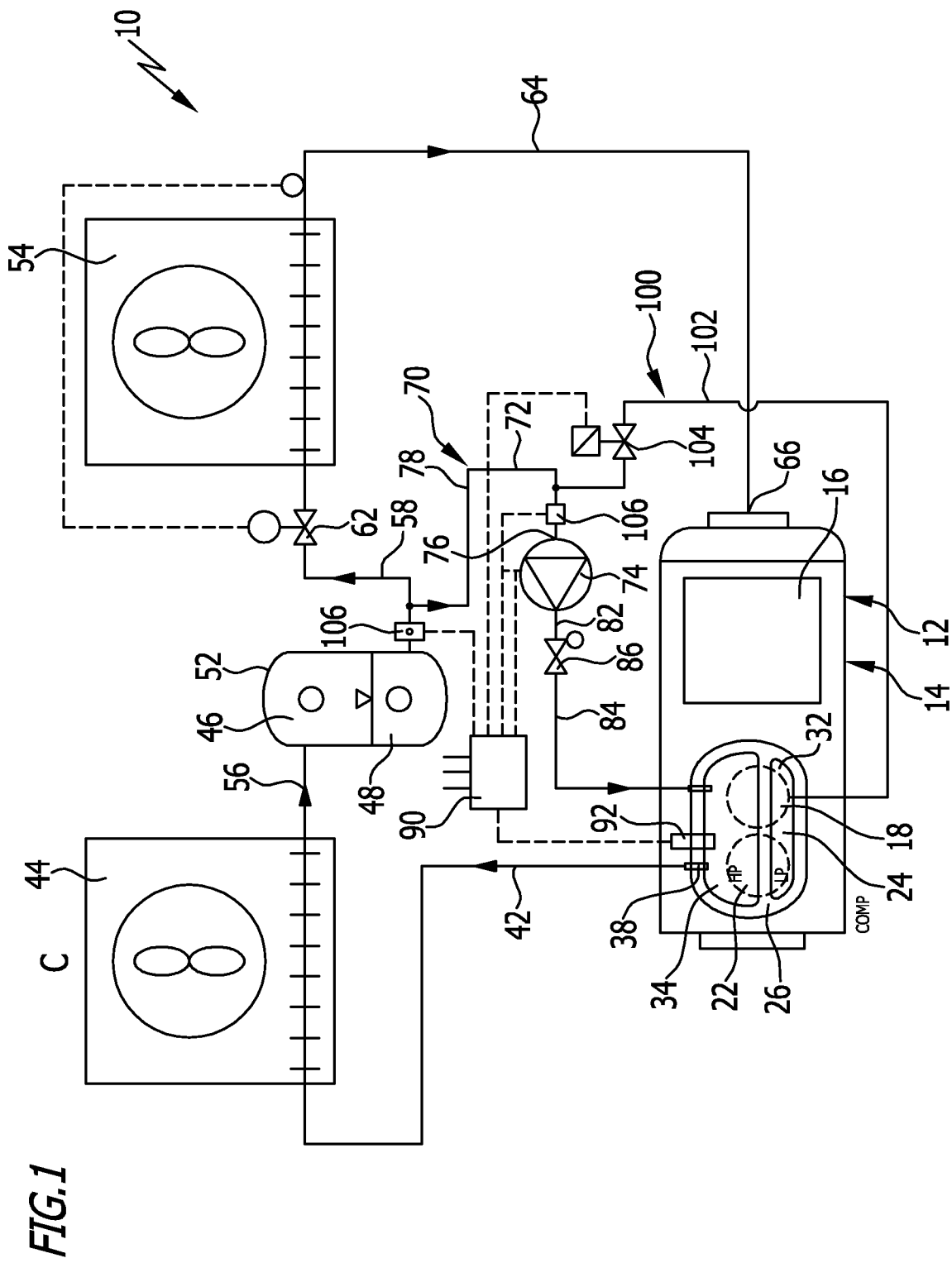
FIG. 1, shows a schematic illustration of a first exemplary embodiment of a cooling circuit in accordance with the invention.

A first exemplary embodiment of a cooling circuit 10 employing a circulating refrigerant in accordance with the invention which is illustrated in FIG. 1 comprises a compressor for the refrigerant which may be in the form of a piston compressor for example and bears the general reference 12.

However, the compressor 12 could also be implemented in the form of a scroll compressor, a rotary piston compressor, a vane compressor or a rotary screw compressor.

In the case of a piston compressor 12, a drive motor 16 is arranged in a compressor housing 14 and it drives pistons 18 in one or more cylinders 22 which are arranged in a cylinder block 24 of the compressor housing 14 and are closed off by at least one cylinder head 26, wherein the at least one cylinder head 26 comprises a suction chamber 32 and a pressure chamber 34, wherein refrigerant that is to be sucked-in is supplied to the suction chamber 32, supplied therefrom to the one or the plurality of cylinders 22 and then, after being compressed by the cylinders 22, is delivered to the pressure chamber 34.

The pressure chamber 34 is provided with a pressure port 38 for compressed refrigerant and a pressure line 42 leads from the pressure port 38 to a condenser 44 which liquefies the pressurised refrigerant in the case of a subcritical mode of operation, or cools it in the case of a supercritical mode of operation, and then supplies it to a fluid collecting chamber 46 in which a refrigerant reservoir 48 consisting of refrigerant, liquid refrigerant in a subcritical mode of operation, is formed.

Hereby, the fluid collecting chamber 46 can be integrated into the condenser 44. However, as illustrated in FIG. 1, the fluid collecting chamber 46 could also be arranged in a collector vessel 52 which forms the fluid collecting chamber and is arranged in the refrigerant circulation path 10 between the condenser 44 and an evaporator 54.

However, the fluid collecting chamber could also be arranged in a supply line which leads to the evaporator 54 and has been widened-out in correspondence with the volume required.

For example, a supply line 56 leads from the condenser 44 to the collector vessel 52 in order to supply the liquefied refrigerant thereto and an evaporator supply line 58 leads from the collector vessel 52 to the evaporator 54, wherein the evaporator supply line 58 is arranged relative to the fluid collecting chamber 46 in such a way as to take liquid refrigerant from the refrigerant reservoir 48 but not vaporous refrigerant.

For its part, the evaporator 54 is additionally provided with a control valve 62 which controls the inflow of refrigerant to the evaporator 54, wherein the refrigerant in the form of a liquid refrigerant then evaporates in the evaporator 54 in a subcritical mode of operation under given pressure conditions and, in a supercritical mode of operation, cools down due to the expansion process and thereby absorbs heat.

The refrigerant that has been evaporated in the evaporator 54 is then fed back to the compressor 12 through a suction line 64 of the refrigerant circulation path 10 which is at suction pressure, wherein for example, a suction port 66 of the compressor 12 is arranged in such a way that the evaporated refrigerant coming from the suction line 64 firstly flows round a drive motor 16 which is arranged at the suction end, cools it and then enters the suction chamber 32 of the cylinder head 26.

Since, in particular, refrigerants having a high compression index such as the refrigerants R407A, R407F, $CO_2$, $NH_3$ for example reach high compression end temperatures, there is substantial heating of the cylinders 22 and the cylinder head 26 in the case of high pressure conditions, especially in the region of the pressure chamber 34 and overall, this then leads to heating of the compressor housing 14 so that the efficiency of the compressor 12 is impaired due to heat transfer losses.

The heating in the region of the pressure chamber can also lead to chemical decomposition of a lubricant being conveyed by the refrigerant mass flow and thus, as a consequence thereof, to the breakdown of the compressor and to contamination of the system.

For this reason, there is provided a feed unit bearing the general reference 70 for the supply of liquid refrigerant from the refrigerant reservoir 48 into the pressure chamber 34 of the at least one cylinder head 26 so that cooling of the pressure chamber 34 is achieved by evaporation of the supplied liquid refrigerant in the pressure chamber 34.

Herein, the feed unit 70 comprises a supply line 72 which either opens out directly into the refrigerant reservoir 48 or branches off from the evaporator supply line 58 and opens out into the pressure chamber 34 of the at least one cylinder head 26.

However, as the pressure in the fluid collecting chamber 46 is lower than the pressure in the pressure chamber 34 due to pressure losses in the pressure line 42 and in the condenser 44, it is in a range of between 0.5 and 5 bar for example in the case of the refrigerants R407A and R407F or refrigerants having similar working pressures and is still lower in the case of high pressure refrigerants such as $CO_2$ for example, there is provided in the supply line 72 a pumping unit 74 for liquid refrigerant which raises the liquid refrigerant from the pressure level in the fluid collecting chamber 46 to at least slightly above the pressure level in the pressure chamber 34 or at most to 5 bar above the pressure level in the pressure chamber and moreover, there is provided in the supply line 72 between the pumping unit 74 and the point of entry thereof into the pressure chamber 34 a check valve 86 which permits the pumping unit 74 to be switched off at any desired time point.

Hereby, the pumping unit 74 comprises an inlet 76 which is connected to a supply line section 78 of the supply line 72 and also an outlet 82 which is connected to a discharge line section 84 of the supply line 72, wherein the discharge line section 84 leads from the outlet 82 to the pressure chamber 34.

In particular, a check valve 86 is arranged in the discharge line section 84, said valve permitting the pumping unit 74 to be switched off if a high temperature above a desired value does not occur in the pressure chamber 34 and only allowing it to switch on when a temperature above a desired value occurs in the pressure chamber 34 of the cylinder head 26.

In order to operate the pumping unit 74, there is provided a controller in the form of refrigerant supply control unit 90 which detects the temperature in the pressure chamber 34 or in a region of the at least one cylinder head 26 bordering the pressure chamber 34 by means of a temperature sensor 92 and then always switches on the pumping unit 74 when the temperature in the pressure chamber 34 or in a region of the cylinder head 26 bordering the pressure chamber 34 exceeds a predetermined threshold value so that the supply of refrigerant to the pressure chamber 34 only occurs in a sub-critical mode of operation when the threshold value is exceeded, whereby the refrigerant then evaporates in the pressure chamber 34 and thereby absorbs heat and thus cools the gaseous refrigerant present in the pressure chamber 34 as well as the cylinders 22 and the compressor housing 14.

In the case of a drive motor of the compressor which is arranged at the pressure end, cooling of the drive motor by the supply of liquid refrigerant is also possible if the refrigerant emerging from the pressure chamber 34 flows around this motor.

The threshold value lies within a range of 80° C. to 150° C. for example, preferably within a range of 110° C. to 130° C., and in particular, in a range of between 115° C. and 125° C.

Furthermore, there is preferably provided a safety cut-out which switches off the compressor 12 in the event that a maximum temperature in the pressure chamber 34 is exceeded, wherein the maximum temperature lies within a range of 130° C. to 150° C., preferably within a range of 135° C. to 145° C.

In order to additionally ensure that the threshold value is not significantly exceeded, the refrigerant supply control unit 90 controls the pumping unit 74 in such a way that the quantity of material being delivered by the pumping unit 74 is regulated, wherein the pumping unit 74 is designed such that a maximum delivery rate thereof is sufficient to meet the envisaged working conditions in order to prevent the threshold value from being permanently exceeded.

The additional refrigerant being supplied to the pressure chamber 34 by way of the supply line 72 then flows to the condenser 44 through the pressure line 42 in addition to the refrigerant that was compressed by the at least one cylinder 22, and it is liquefied in the condenser 44.

In particular, the supply of refrigerant to the pressure chamber 34 is effected until such time as the temperature measured by the temperature sensor 92 drops back below the threshold value.

In order to ensure that the pumping unit 74 conveys substantially only liquid refrigerant, there is associated with the supply line 72 a gas discharge unit 100 which comprises a gas discharge line 102 that branches off from the supply line section 78 in the first exemplary embodiment illustrated in FIG. 1, wherein said gas discharge line may join the cooling circuit 10 between the evaporator 54 and the at least one cylinder 22 which represents a flow path of the refrigerant that is at suction pressure.

This means that the gas discharge line 102 can, for example, open out into the suction line 64 or into the suction port 66, or, it can open out in the compressor housing 14 into the flow path running therethrough for the refrigerant that is being sucked in and is flowing to the suction chamber 32 or, it could also open out directly into the suction chamber 32 as is illustrated in FIG. 1.

For the purposes of activating the gas discharge line 102, there is provided therein a gas discharge valve 104 which is controllable by the refrigerant supply control unit 90.

For example, activation of the gas discharge line 102 is effected by opening the gas discharge valve 104 when switching on the pumping unit 74 or before switching it on so that, due to the large pressure gradient between the pressure in the supply line section 78 of the supply line 72 and the suction pressure of the compressor 12, the gas that collects in the supply line section 78 as a result of the heating process occurring when the pumping unit 74 is switched off is supplied to the compressor 12 at the suction end via the gas discharge line 102 and in consequence liquid refrigerant flows thereafter from the refrigerant reservoir 48 into the supply line 72.

If liquid refrigerant is present at the inlet 76 of the pumping unit 74, the refrigerant supply control unit 90 can close the gas discharge valve 104 and thus deactivate the gas discharge line 102 since the pumping unit 74 can then convey the liquid refrigerant present at the inlet 76 thereof and bring the pressure up to a level such that this refrigerant will flow into the pressure chamber 34 of the at least one cylinder head 26 in order to be evaporated in the pressure chamber 34 and thus—as described—to cool down in the pressure chamber 34.

The presence of liquid refrigerant at the inlet 76 of the pumping unit 74 can be ensured in the most varied of manners.

A first possibility envisages the opening of the gas discharge valve 204 for a time period that is definable in regard to the length of time thereof, wherein the length of time is measured in such a way as to ensure that liquid refrigerant will definitely be available at the inlet 76 of the pumping unit 74 at the end of the period under all the usual operating conditions.

Hereby, the length of time can be fixed in accordance with the maximum length of time that is necessary under all possible operating conditions.

However, it is also possible to detect the operating conditions occurring at different positions of the cooling circuit by means of sensors such as sensors for the ambient temperature and/or sensors for the temperatures in the evaporator and/or pressure sensors for example and to set the length of time in a variable manner in accord with the particular operating conditions that have been detected.

A second possibility envisages that the presence of liquid refrigerant be detected by means of at least one liquid sensor 106. Hereby, this liquid sensor 106 can be arranged in the supply line section 78 such as directly before the inlet 76 of the pumping unit 74 for example and/or in the gas discharge line 102 such as at the point of branching from the supply line section 78 and/or at the point of entry into the refrigerant path which is at suction-side pressure for example.

As soon as the temperature in the pressure chamber 34 or in the part of the cylinder head 26 bordering the pressure chamber 34 has dropped again to such an extent that it is under the threshold value, the refrigerant supply control unit 90 switches off the pumping unit 74 so that the feed unit 70 will be inactive until such time as the threshold value for the temperature in the pressure chamber 34 or in the part of the cylinder head 26 bordering the pressure chamber 34 is exceeded once again.

In the first exemplary embodiment, the gas discharge line 102 branches from the supply line section 78 of the supply line 72 as directly as possible before the inlet 76, preferably at the inlet 76, in order to conduct away all the gas from the supply line section 78 before the inlet 76 of the pumping unit 74 so that the pumping unit 74 sucks in as little as possible or, if possible, no gaseous refrigerant at all, but rather, when it is switched on, it can directly pump out liquid refrigerant.

Figure 2:
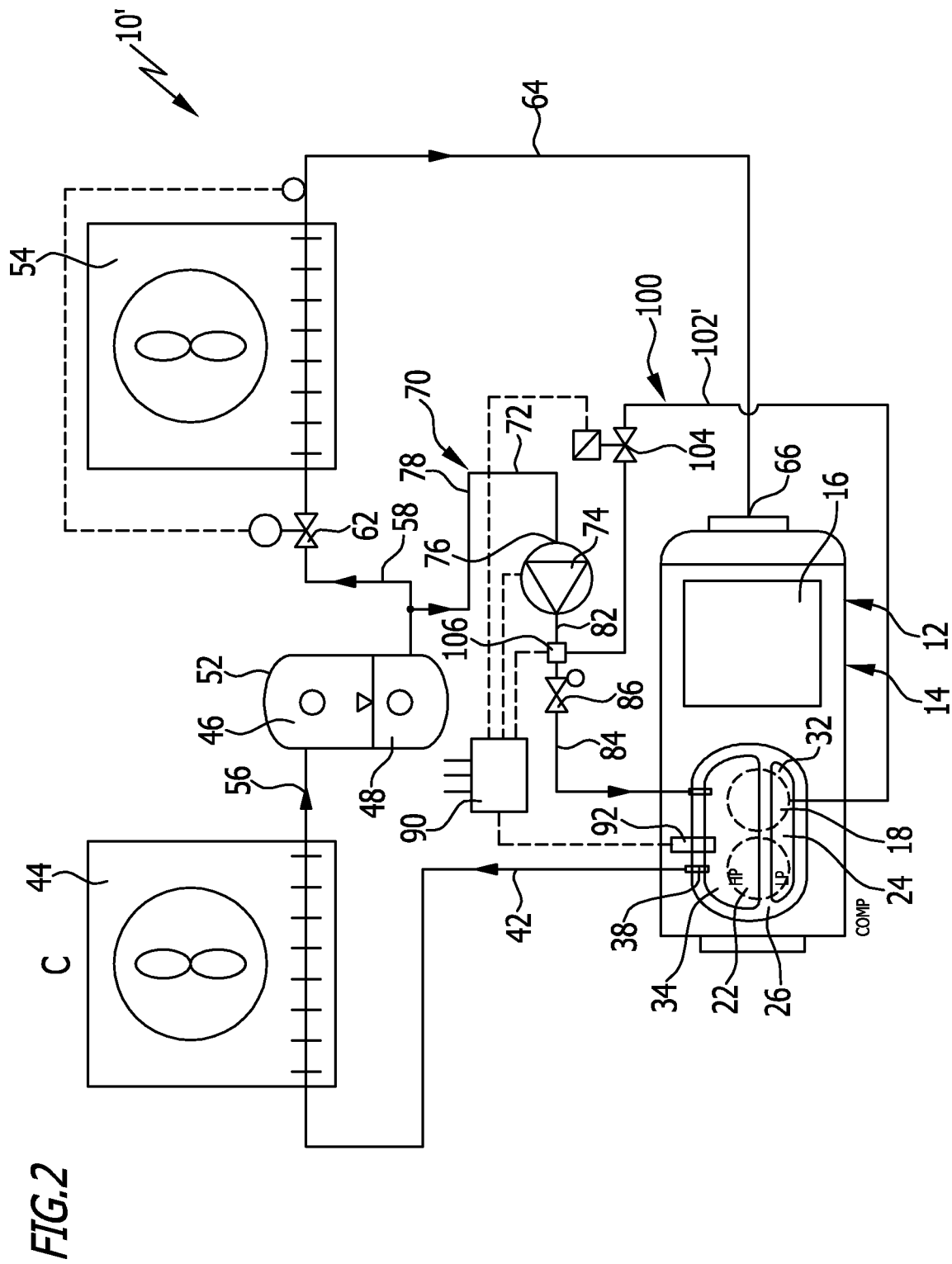
FIG. 2, a schematic illustration similar to FIG. 1 of a second exemplary embodiment of a cooling circuit in accordance with the invention.

As an alternative thereto, provision is made in a second exemplary embodiment of a cooling circuit 10' in accordance with the invention that is illustrated in FIG. 2 for the gas discharge line 102' to branch out from the pressure port 38 or from the supply line 72, for example, between the outlet 82 of the pumping unit 74 and the check valve 86 in the discharge line section 84 so that, upon activating the gas discharge line 102, there will be a pressure gradient through the pumping unit 74 which permits certain flooding of the pumping unit 74 with liquid refrigerant so that, after deactivating the gas discharge line 102 by closing the gas discharge valve 104, the pumping unit 74 as a whole is flooded with liquid refrigerant and thus immediately begins to pump liquid refrigerant.

Hereby, the check valve 86 prevents the process of conducting away the gaseous refrigerant from negatively affecting the pressure in the pressure chamber 34.

This solution is attractive in particular if the pumping unit 74 is constructed in such a way that a pressure gradient occurring therein in the pumping direction can assist the conveyance of gaseous refrigerant.

In all other respects, the second exemplary embodiment of the cooling circuit in accordance with the invention in accord with FIG. 2 is constructed in the same way as the first exemplary embodiment so that the same parts are provided with the same reference symbols and reference can be made to the full extent of the remarks relating to the first exemplary embodiment in regard to the description thereof.

In regard to the construction of the pumping unit 74, no detailed indications have as yet been given.

Figure 3:
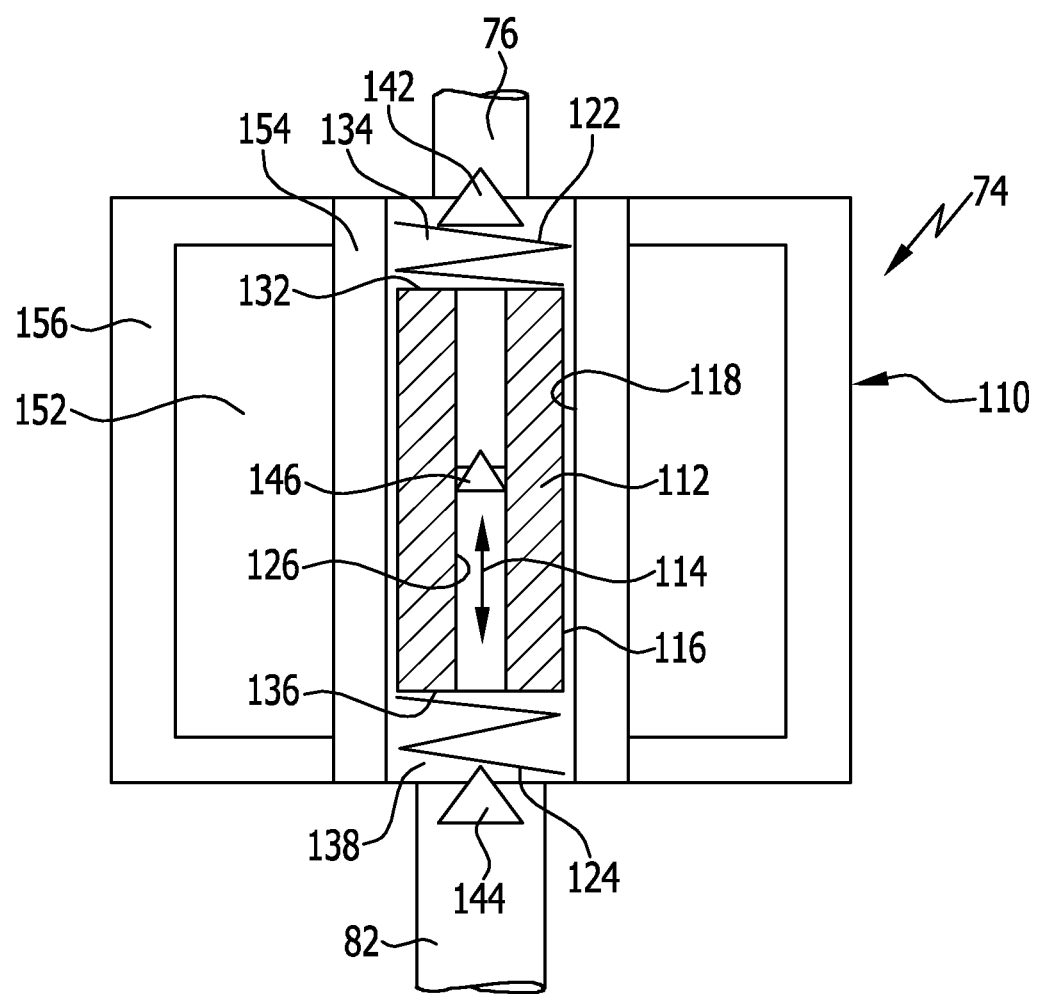
FIG. 3, a schematic illustration of a first exemplary embodiment of a pumping unit provided in accordance with the invention.

A first exemplary embodiment of a pumping unit 74 in accordance with the invention which is illustrated in FIG. 3 is constructed in the form of a piston pump 110 which comprises a piston 112 that moves in a reciprocating linear manner in an oscillation direction 114.

To this end, an outer piston surface 116 of the piston 112 is guided in a pumping chamber 118 such as to be moveable in the direction of oscillation 114 and, for example, it is arranged between two springs 122 and 124 so that the piston 112 can move in the pumping chamber 118 in the direction of oscillation 114 due to the compression of one of the springs 122, 124 and the relaxation of the other one of the springs 122, 124.

For example, the piston 112 is provided with a passage 126 so that the medium that is to be conveyed can flow therethrough.

Furthermore, a first variable volume 134 is formed between a first end face 132 of the piston 112 and the inlet 76 and a second variable volume 138 is formed between a second end face 136 of the piston 112 and the outlet 82.

Moreover, an inlet valve 142 is arranged between the inlet 76 and the first volume 134, an outlet valve 144 is arranged between the second volume 138 and the outlet 82 and yet another piston valve 146 which is arranged in the passage 126 for example is associated with the piston 112.

If the piston 112 moves in such a way that the second volume 138 becomes smaller whilst the first volume 134 grows larger, then the outlet valve 144 opens and the liquid refrigerant flows out of the piston chamber due to the reduction of the second volume 138. At the same time, the inlet valve 142 opens since the first volume 134 has become larger so that liquid refrigerant can enter the pumping chamber 118 via the inlet 76.

The piston valve 146 remains closed hereby.

If then the piston 112 moves in such a way that the first volume 134 becomes smaller and the second volume 138 grows larger, then both the inlet valve 142 and the outlet valve 144 close whilst the piston valve 146 opens and liquid refrigerant can thus be transferred from the first volume 134 through the passage 126 into the second volume 138, whereupon the piston valve 146 opens.

The movements of the piston 112 in the direction of oscillation 114 are enabled by an electromagnet 152 which is arranged outside the pumping chamber 118, the magnetic field thereof being effective on the piston 112 in such a manner that the latter is moved in reciprocating manner in the direction of oscillation 114.

For example, this is made possible by virtue of the magnetic field of the electromagnet moving the piston 112 in a direction leading to a reduction of the second volume 138, and removal of the magnetic field of the electromagnet 152 leads to the piston 112 moving in a direction producing a reduction of the first volume 134 due to the effect of the springs 122 and 124, and a renewed activation of the electromagnet 152 again leads to a movement of the piston 112 in a direction producing a reduction of the second volume 138.

Since the piston pump 110 works at pressures in a range of over 15 bar, preferably in a range of over 20 bar and still better in a range of over 25 bar, the piston pump 110 is constructed in such a way that a pumping chamber housing 154 forming the pumping chamber 118 is hermetically sealed and in particular is also connected to the inlet 76 and to the outlet 82 in hermetically sealed manner, wherein in this case, the electromagnet 152 does not have to be arranged in a hermetically sealed housing 156, but rather, the field effect thereof is effective on the piston 112 through the pumping chamber housing 154.

Another solution envisages that the piston pump 110 comprise a hermetically sealed outer housing 156 which encompasses the pumping chamber housing 154 and which is connected to the inlet 76 and to the outlet 82 in hermetically sealed manner, wherein the electromagnet 152 is also located within the outer housing 156 at a pressure level lying above 15 bar, preferably above 20 bar and still better above 25 bar.

In both cases it is thus possible to hold the liquid refrigerant that is to be conveyed in a housing which encloses it hermetically and in particular one which is free of mechanical feed-throughs for the drive for the piston 112.

Figure 4:
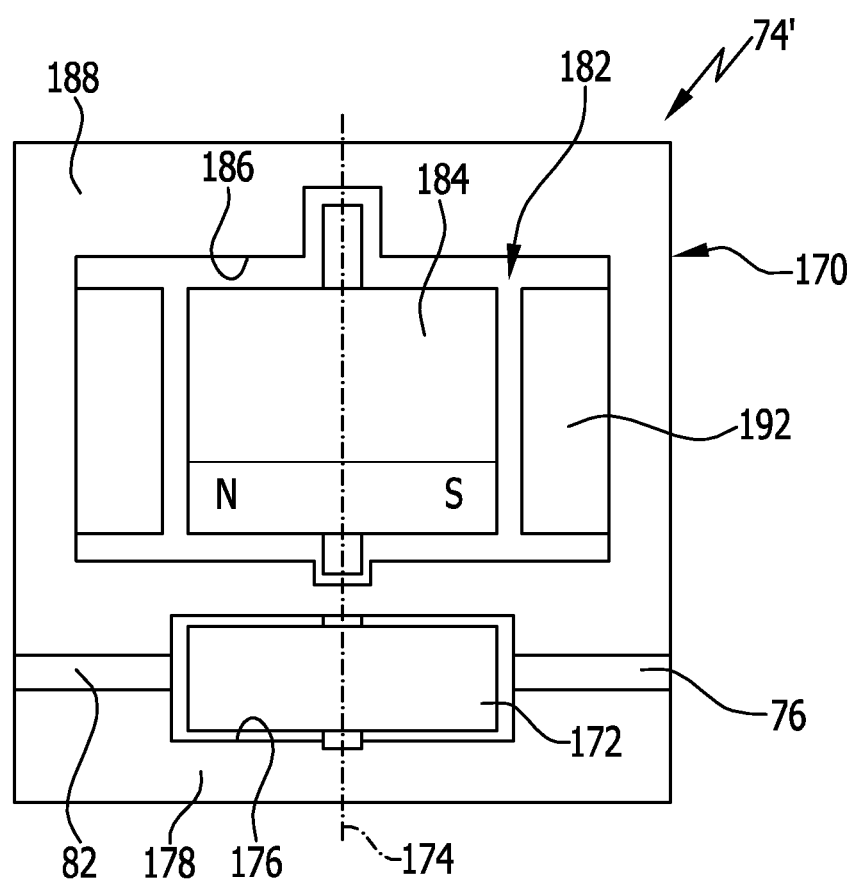
FIG. 4, a schematic illustration of a second exemplary embodiment of a pumping unit in accordance with the invention and FIG. 5, a schematic illustration of a variant of the second exemplary embodiment of the pumping unit in accordance with the invention.

A second exemplary embodiment of a pumping unit 74' in accordance with the invention is illustrated in FIG. 4. This pumping unit is in the form of a rotary pump 170 which comprises a pumping element 172 that is driven in rotary manner about an axis 174.

For example, the pumping element 172 is a gear wheel of a gear pump which cooperates with a further gear wheel that is not visible in FIG. 4.

Here, liquid refrigerant is advanced from the inlet 76 to the outlet 82, wherein the pumping element 172 is arranged in a pumping chamber 176 which is connected to both the inlet 76 and the outlet 82.

The pumping chamber 176 here is arranged in a pumping chamber housing 178 which does not comprise any sort of mechanical feed-throughs for the drive means for the pumping element 172.

Rather, the drive for the pumping element 172 is effected by means of magnetic coupling between a rotor 184 of a drive motor 182, wherein the rotor 184 is arranged in an interior space 186 of a motor housing 188 adjoining the pumping chamber housing 178 such that it is coaxial with the pumping element 172 so that the reciprocally acting magnetic interaction between the rotor 184 and the pumping element 172 is effected through the motor housing 188 and the pumping chamber housing 178.

Furthermore, a stator 192 which encloses the rotor 184 and is effective for the rotary motion of the rotor 184 is arranged in the interior of the motor housing 188.

In this exemplary embodiment, in which the pumping element 172 in the pumping chamber 176 does not comprise any sort of mechanical feed-throughs for the operation of the pumping element 172, the pumping chamber 176 is connected exclusively to the inlet 76 and the outlet 82 whilst the drive means for the pumping element 172 is provided by means of a reciprocally acting magnetic interaction between the pumping element and the rotor 184.

Figure 5:
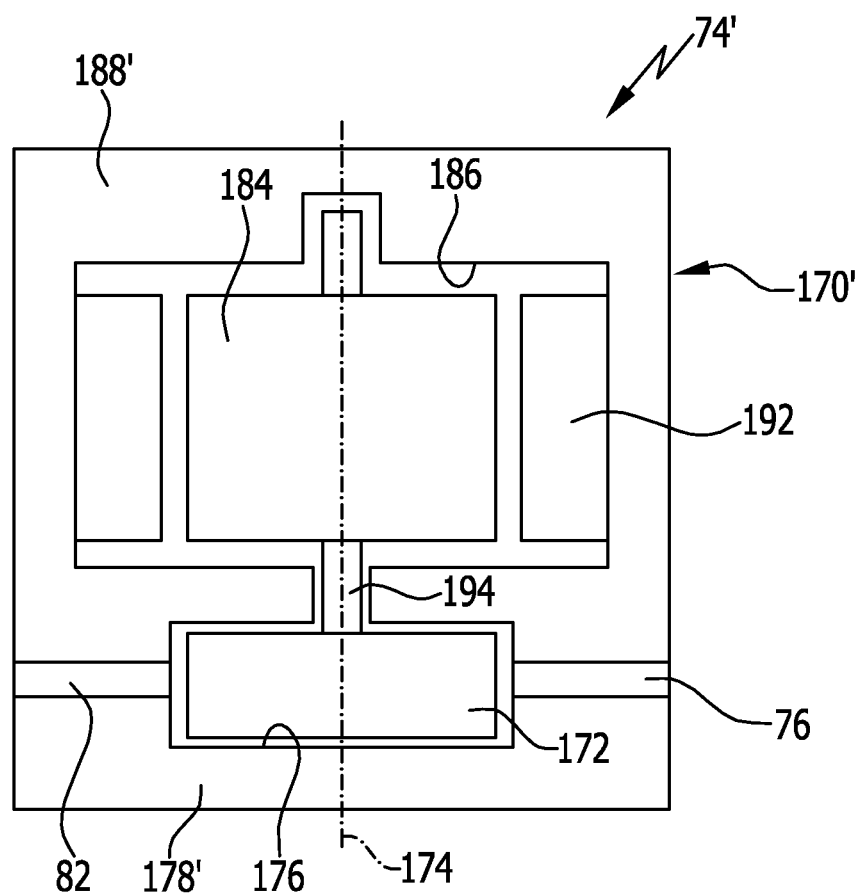

In a variant of the second exemplary embodiment of the pumping unit 74' which is constructed in the form of a rotary pump 170' and is illustrated in FIG. 5, the pumping chamber housing 178' and the motor housing 188 form a hermetically sealed unit so that the interior 186 of the motor housing 188 accommodating the rotor 184 and the stator 192 can adopt the same pressure level as the pumping chamber 176.

In this case, it is thus also possible for the pumping element 172 to be coupled to the rotor 184 by means of a mechanical shaft 194 so that the rotor 184 together with the shaft 194 and the pumping element 172 represent a mutually non-rotationally connected unit which rotates about the axis 174.

Consequently, in this exemplary embodiment too, there also arises the possibility of working with the pumping element 172 at a very high pressure level of over 15 bar for example, still better, a level of over 20 bar and even better of over 25 bar without leakage losses due to mechanical feed-throughs for the drive means.

With regard to the maximum delivery rate of the compressor 12 in all of the preceding exemplary embodiments, the delivery rate envisaged for the feed unit 70 amounts to less than 100%, still better less than 50% and preferably less than 30% of this maximum delivery rate of the compressor 12.

In the case of the two embodiments of the pumping units 74 and 74' in accordance with the invention, the dimensioning thereof is effected such that the maximum handling capacity of a pumping unit of this type amounts to 100 litres or less per hour so that one or possibly more parallel-working, very small pumping units having a very low power consumption can be used.

Preferably hereby, the handling capacity of one of the pumping units 74, 74' of this type that are to be used is at least 0.3 litres per hour, still better at least 0.3 litres per hour [sic], or more.

Furthermore, in both embodiments of the pumping units 74, 74', additional regulation of the handling capacity of the pumping units 74, 74' can be effected by means of the refrigerant supply control unit 90 so that the handling capacity of the pumping units 74, 74' can be adapted to the requisite cooling performance in the pressure chamber 34 by the supplied refrigerant.

The invention claimed is:

1. A cooling circuit comprising
a refrigerant compressor incorporating a suction port and
a pressure chamber incorporating a pressure port, a condenser which is arranged in the cooling circuit downstream of the pressure port, a fluid collecting chamber in which a refrigerant reservoir of refrigerant is formed, an evaporator located in the cooling circuit between the condenser and the suction port, a feeder comprising a feed line which is connected at one side to the refrigerant reservoir and to the pressure chamber at an other side and which serves for supplying refrigerant from the refrigerant reservoir to the pressure chamber and which incorporates a pump for the refrigerant, and a gas discharge unit is associated with the pump, said gas discharge unit comprises a gas discharge line for conducting away gaseous refrigerant from the feed line of the feeder, and wherein the gas discharge line intersects and branches off of the feed line for removal of gaseous refrigerant within the feed line.

2. The cooling circuit in accordance with claim 1, wherein the gas discharge line is connected to a refrigerant path of the cooling circuit which is at suction-side pressure.

3. The cooling circuit in accordance with claim 1, wherein the gas discharge unit is connected to a supply line section of the feeder leading to an inlet of the pump.

4. The cooling circuit in accordance with claim 1, wherein the gas discharge unit is connected to a discharge line section of the feeder leading from an outlet of the pump to the pressure chamber.

5. The cooling circuit in accordance with claim 1, wherein an on-off valve is associated with the gas discharge unit for the purposes of activating and deactivating it.

6. The cooling circuit in accordance with claim 1, wherein a controller controls the on-off valve of the gas discharge unit, namely, in particular in such a way that a gas discharge from the feeder is effected during a time period before starting or when starting the pump.

7. The cooling circuit of claim 1, further comprising a valve operable to open the gas discharge line if a gas cushion of refrigerant develops in the feed line due to the pump being off and is operable to close when the gas cushion is absent from the feed line.

8. The cooling circuit of claim 7, wherein the gas discharge line connects to an inlet side of the feed line upstream of the pump such that the valve can opens the gas discharge line when a gas cushion of refrigerant is on an inlet side of the pump.

9. The cooling circuit of claim 7, wherein the gas discharge line connects to an outlet side of the feed line downstream of the pump such that the valve can opens the gas discharge line when a gas cushion of refrigerant is on a downstream side of the pump.

10. The cooling circuit of claim 1, wherein the pump comprises a pressure-tight closed housing which is provided with only one inlet and one outlet as access points.

11. The cooling circuit of claim 10 wherein the pump further comprises a rotary pump element which rotates about an axis for pumping the liquid refrigerant, the rotary pump element arranged in a pumping chamber of the pressure-tight closed housing, the pressure tight closed housing having no mechanical access for driving the rotary pump element, and the rotary pump element is driven by an electromagnetic or magnetic force that is effective through the pressure-tight closed housing for driving the rotary pump element by a rotor of a motor arranged coaxially in a space in a motor housing adjacent to the pumping chamber, the rotor being coupled to the pump element by said electromagnetic or magnetic force through said pressure-tight closed housing.

12. The cooling circuit of claim 10, wherein the pump further comprises a rotary pump element which rotates about an axis for pumping the liquid refrigerant, the rotary pump element arranged in a pumping chamber of the pressure-tight closed housing, the pressure tight closed housing having no mechanical access for driving the rotary pump element, and the rotary pump element is driven by a rotor of a motor arranged coaxially in the pressure tight housing adjacent to the pumping chamber, the rotor being coupled to the pump element.

13. The cooling circuit of claim 10 wherein the pump further comprises an oscillating pump element which is spring loaded for oscillation along an axis for pumping the liquid refrigerant and which is arranged in a pumping chamber of the pressure-tight closed housing, the pressure tight closed housing having no mechanical access for driving the oscillating pump element, and the oscillating pump element is driven by an electromagnetic or magnetic force that is effective through the pressure-tight closed housing and generated by a magnet arranged outside said pressure-tight closed housing.

14. A method of operating a cooling circuit comprising a refrigerant compressor incorporating a suction port and a pressure chamber incorporating a pressure port, a condenser which is arranged in the cooling circuit downstream of the pressure port, a fluid collecting chamber in which a refrigerant reservoir of refrigerant is formed, an evaporator which is located in the cooling circuit between the condenser and the suction port, a feeder comprising a feed line which is connected at one side to the refrigerant reservoir and to the pressure chamber at another side and which serves for supplying refrigerant from the refrigerant reservoir to the pressure chamber which incorporates a pump for the refrigerant, comprising: supplying refrigerant by means of the feeder to the pressure chamber for cooling purposes; and conducting gaseous refrigerant away from the feed line of the feeder by means of a gas discharge unit including a gas discharge line, removing a gas formation of refrigerant from within the feed line if formed in the feed line during off periods of the pump.

15. The method in accordance with claim 14, wherein the gaseous refrigerant is supplied to a refrigerant path of the cooling circuit which is at suction-side pressure of said refrigerant compressor.

16. The method in accordance with claim 14, wherein the gaseous refrigerant is conducted away from a supply line section of the feed line of the feeder which leads to an inlet of the pump.

17. The method in accordance with claim 14, wherein the gaseous refrigerant is conducted away from a discharge line section of the feed line of the feeder which leads from an outlet of the pump to the pressure chamber.

18. The method in accordance with claim 14, wherein the gaseous refrigerant is sucked out for a time period before starting or when starting the pump.

19. The method of claim 14, wherein the removing of the gas cushion of refrigerant occurs at an upstream side of the pump along the feed line.

20. The method of claim 14, wherein the removing of the gas cushion of refrigerant occurs at an downstream side of the pump along the feed line.

21. The method of claim 14, wherein the pump comprises a pressure-tight closed housing which is provided with only one inlet and one outlet as access points.

22. The method of claim 21 wherein the pump further comprises a rotary pump element which rotates about an axis for pumping the liquid refrigerant, the rotary pump element arranged in a pumping chamber of the pressure-tight closed housing, the pressure tight closed housing having no mechanical access for driving the rotary pump element, and the rotary pump element is driven by an electromagnetic or magnetic force that is effective through the pressure-tight closed housing for driving the rotary pump element by a rotor of a motor arranged coaxially in a space in a motor housing adjacent to the pumping chamber, the rotor being coupled to the pump element by said electromagnetic or magnetic force through said pressure-tight closed housing.

23. The method of claim 21, wherein the pump further comprises a rotary pump element which rotates about an axis for pumping the liquid refrigerant, the rotary pump element arranged in a pumping chamber of the pressure-tight closed housing, the pressure tight closed housing having no mechanical access for driving the rotary pump element, and the rotary pump element is driven by a rotor of a motor arranged coaxially in the pressure tight housing adjacent to the pumping chamber, the rotor being coupled to the pump element.

24. The method of claim 21 wherein the pump further comprises an oscillating pump element which is spring loaded for oscillation along an axis for pumping the liquid refrigerant and which is arranged in a pumping chamber of the pressure-tight closed housing, the pressure tight closed housing having no mechanical access for driving the oscillating pump element, and the oscillating pump element is driven by an electromagnetic or magnetic force that is effective through the pressure-tight closed housing and generated by a magnet arranged outside said pressure-tight closed housing.

* * * * *